United States Patent [19]

Millick, III

[11] 4,394,286
[45] Jul. 19, 1983

[54] PARTIALLY HYDROLYZED, DMT PROCESS RESIDUE, AND USEFUL PROPYLENE OXIDE DERIVATIVE THEREOF

[75] Inventor: William H. Millick, III, Wilmington, N.C.

[73] Assignee: Hercofina, Wilmington, N.C.

[21] Appl. No.: 265,503

[22] Filed: May 20, 1981

[51] Int. Cl.$^3$ .................. C08G 18/48; C09K 3/00; C07C 69/76; C08F 6/00

[52] U.S. Cl. .................. 252/182; 521/172; 528/83; 528/499; 528/500; 560/79; 560/103

[58] Field of Search .................. 528/499, 500, 83, 491; 521/172; 560/79, 103; 252/182

[56] References Cited

U.S. PATENT DOCUMENTS

| | | | |
|---|---|---|---|
| 2,910,490 | 10/1959 | Malkemus | 560/71 |
| 3,647,759 | 3/1972 | Walker | 528/305 |
| 3,655,820 | 4/1972 | Kaupp | 528/309 |
| 3,865,628 | 2/1975 | Callahan et al. | 134/2 |
| 3,892,796 | 7/1975 | Leibfried | 560/118 |
| 4,223,068 | 9/1980 | Carlstrom et al. | 521/172 |
| 4,237,238 | 12/1980 | De Guiseppi et al. | 521/172 |

OTHER PUBLICATIONS

Derwent DT 2655-463, Inst. Ciezkiej Syntez Org. 6-2-3-77.
Derwent GB1491-284-Teijin Hercules Che. KK, 5-3-0-75.
Derwent J5 1048-760-Mitsubishi Chem. Ind. KK, 4-2-7-76.
Derwent SU-563-395-Bels Road Res. Inst., 7-20-77.

*Primary Examiner*—H. S. Cockeram
*Attorney, Agent, or Firm*—George H. Hopkins

[57] ABSTRACT

Disclosed is partially hydrolyzed, DMT process residue. Also disclosed is the reaction product of propylene oxide and the partially hydrolyzed, DMT process residue. The reaction product is useful as a polyol reactant in the preparation of urethane foams.

9 Claims, No Drawings

PARTIALLY HYDROLYZED, DMT PROCESS RESIDUE, AND USEFUL PROPYLENE OXIDE DERIVATIVE THEREOF

This invention is in the chemical arts. More particularly, it relates to organic chemistry.

DMT esterified oxidate residue or, more simply, DMT process residue, has been defined and described in such U.S. patents as the U.S. Pat. No. 3,647,759, to Walker, the U.S. Pat. No. 3,655,820, to Kaupp, and the U.S. Pat. No. 3,892,796, to Leibfried, and to this extent the disclosures thereof are incorporated herein by reference. In brief it is at 20°–25° C. a tar-like or solid material composed of a highly complex mixture which up to now has been only partially analyzed. The mixture comprises high molecular weight monomeric and polymeric components, a major portion of which comprises the methyl and benzyl esters of biphenyl and triphenyl dicarboxylic and tricarboxylic acids. Although as purged from the DMT process, it usually contains oxidation and esterification catalyst material, in a number of DMT plants as much as practical of that catalyst material is recovered for reuse in the DMT process from the DMT process residue before disposing of the residue or using it as in this invention. In addition, in a number of DMT plants the residue is treated both physically and chemically to recover for recycle in the DMT process as mush as practical of p-xylene values such as dimethyl terephthalate and its precursors in the process. Such treatment, however, does not significantly alter the basic, above-described, chemical composition of the residue. Hence, "DMT process residue" as used herein includes residue of the DMT process as purged from the process, and such residue after such treatment and either with or without oxidation catalyst material.

As far as the instant invention is concerned, typical ranges of significant properties of DMT process residue are:

| Appearance at 20–25° C. | Dark brown, balsamic resin or tar |
| --- | --- |
| Acid No., mg KOH/g | 1–100 |
| Drop Softening Point, °C. | 20–120 |
| Methoxyl, % | 8–25 |
| Dimethyl terephthalate, % | 0–18 |
| Water, % | 0–0.5 |
| Viscosity at 130° C., cps | 5–10,000 |

The Drop Softening Point data above and hereinafter are obtained by the Hercules Drop Softening Point Method. This method is described on page 12 of a booklet titled, "Wood Rosins, Modified Rosins and Related Resins", published in 1963 by Hercules Powder Company, now by change of name Hercules Incorporated. The special standard thermometer is a total immersion mercury thermometer having a range of 0°–250° C. with 1° subdivisions. The bulb is ⅜±1/32 inch long, and ¼±1/16 inch in diameter. The weight of sample on the thermometer bulb is 0.50–0.55 gram.

The Acid No. data above and hereinafter are obtained by ASTM method D1639.

The Viscosity at 130° C. data above and hereinafter are obtained with a Brookfield viscometer, LV Series, using spindle no. 3 at a speed of 30 r.p.m.

The Methoxyl data above and hereinafter are obtained by ASTM method D1166-60.

All other data, unless specifically noted otherwise, are obtained by conventional methods.

Also, all percentages set forth in this specification are by weight.

This invention is based on the concept of treating DMT process residue to partially hydrolyze it and from a useful reaction product having a number of desirable chemical and physical properties.

This invention also is based on the concept of reacting partially hydrolyzed, DMT process residue with propylene oxide to give another useful reaction product with advantageous physical and chemical properties.

This invention, in summary, comprises partially or incompletely hydrolyzed, DMT process residue, and the propylene oxide derivative thereof.

The partially hydrolyzed, DMT process residue product of this invention is DMT process residue in which a substantial portion, but not all, of the esters therein have been hydrolyzed. It, therefore, differs from completely or drastically hydrolyzed, DMT process residue in which substantially all of the esters therein are hydrolyzed. Partially hydrolyzed, DMT process residue is characterized by the following typical ranges of chemical and physical properties:

| Appearance at 20–25° C. | Dark brown solid tar-like material |
| --- | --- |
| Acid No., mg KOH/g | 150–375 |
| Drop Softening Point, °C. | 25–160 |
| Methoxyl, % | 2.5–18 |
| Water, % | 0–5 |
| Viscosity at 130° C., cps | 10-Semi-solid |

Although the range of Methoxyl values overlaps the typical range of Methoxyl values of DMT process residue, the actual Methoxyl value of a specific partially hydrolyzed, DMT process product of this invention generally is lower than the actual Methoxyl value of the specific DMT process residue from which the product is made.

A feature of advantage of the partially hydrolyzed, DMT process residue product is that the melting temperature can be low enough for it to be readily handled as a fluid when heated to a reasonable temperature. This contrasts to the intractable solids obtained when complete hydrolysis is carried out.

Another feature of advantage of the partially hydrolyzed, DMT process residue product is that its equivalent weight and to a considerable extent its functionality (that is, carboxyl end groups per mole) can be varied over a fairly wide range by selection of the conditions of partial hydrolysis of DMT process residue.

The product is made by charging a reactor with water and DMT process residue. The weight ratio of the total amount of water (including that, if any, in the residue) to the residue generally is about 0.05–5. The resulting mixture is established under pressure at about 220–1150 psig at a temperature of about 200°–285° C., and the resulting mixture is maintained under these temperature and pressure conditions for the period of time needed to achieve the desired extent of hydrolysis of the esters in the mixture without hydrolysis of substantially all the esters therein, as reflected by Acid No. and Methoxyl content. As DMT process residue is hydrolyzed, its Acid No. increases and its Methoxyl value decreases. Hence, the Acid No. of partially hydrolyzed residue will be significantly greater than the Acid No. of the residue before hydrolysis, but substantially lower than the Acid No. of the residue after complete or drastic hydrolysis. On the other hand, the Methoxyl value of partially hydrolyzed residue will be significantly lower than the Methoxyl value of the residue before hydrolysis, but higher than the Methoxyl value of completely or drastically hydrolyzed DMT process residue.

When the partially hydrolyzed, DMT process residue product is to be propoxylated (reacted with propylene oxide) for use as a polyol reactant in the production of urethane foams, the Acid No. of the partially hydrolyzed residue can vary over a wide range, depending on the amount of the propoxylated product to be included in the polyol formation. Even residue hydrolyzed to an Acid No. of 150 is useful. However, to achieve the economic and foam property benefits obtainable from a DMT process residue based polyol material, it is desirable that the reaction product have a higher Acid No., preferably over about 250. The upper limit is dictated primarily by the physical problems associated with handling of the reaction product. The substantial economic and practical advantage of partially hydrolyzed, DMT process residue is that it can be handled as a molten material even though it can have a substantial concentration of suspended precipitated solids. The difficulties and costs of processing and handling an essentially completely hydrolyzed, DMT process residue, which has a substantial concentration of finely divided solids, are avoided. To the extent that a diluent such as dipropylene glycol can be used, the product Acid No. can be higher than otherwise and still give a handleable flowable product. The practical upper limit of Acid No. for the partially hydrolyzed, DMT process residue of this invention is about 375.

The amount of time for the partial hydrolysis reaction to take place is dependent on the desired extent of partial hydrolysis, temperature, pressure, presence or absence of a catalyst, and the like. In general, the reaction time is in a range from about 10 minutes to about 10 hours. Shorter and longer times, however, are within the broader scope of this invention.

Use of a catalyst is optional; generally, however, it is unnecessary.

The extent of hydrolysis also is determined by the amount of water in the mixture, and the amount of methanol formed in the hydrolysis reaction which is removed from the reactor. In one embodiment, however, no venting of the reactor is done at reaction temperatures, the extent of hydrolysis being primarily determined by the chemical equilibrium of the reaction system. Steam sparging during the reaction can be employed to provide a source of water, heat and agitation for the reaction mixture.

Hence, a wide range of process conditions can be used to effect partial hydrolysis of the residue. General and preferred conditions are summarized as follows, all parts being parts by weight, and "Stm." meaning "Steam".

|  | General | | Preferred | |
| --- | --- | --- | --- | --- |
|  | Without Stm. Sparge | With Stm. Sparge | Without Stm. Sparge | With Stm. Sparge |
| Charge ratio of water to residue, parts H$_2$O/part residue | 0.08–4 | 0–2 | 0.1–2 | 0.1–1 |
| Reaction | 200–285 | 200–285 | 230–270 | 230–270 |
| Temp., °C. |  |  |  |  |
| Reaction pressure, psig. | 220–1150 | 220–1100 | 400–950 | 400–900 |
| Steam Sparge Ratio, parts steam/part residue | — | 0.05–3 | — | 0.1–2 |

The reaction can be carried out on a batch basis, and the resulting reaction mixture cooled via heat exchange with internal reactor coils or a reactor jacket to about 110° C. before venting, thereby avoiding excessive sublimate from vented gases. Alternatively, the amount of water in the charge can be reduced somewhat to allow for the further hydrolysis which occurs when the reaction mixture is cooled by venting, with provision to handle the organic material which appears in the vented gases. The partial hydrolysis reaction also can be carried out continuously as, for example, in staged reactors or in a countercurrent steam sparged tower designed to provide adequate residence time.

Removal of most of the residual water from the reaction mixture after the desired extent of partial hydrolysis has been reached is easily accomplished by maintaining the reaction mixture above 100° C. for a time sufficient for evaporation of residual water from the mixture. Also, sparging of the reaction mixture with an inert gas such as nitrogen or applying vacuum to the reactor can be employed when a low water content is desired, but generally this is unnecessary.

The resulting reaction mixture namely, partially hydrolyzed, DMT process residue, can be used as is. In some embodiments a flakeable solid is obtained which can be melted for use. However, for many uses a diluent desirably is incorporated into this mixture to give a more readily handleable product, especially when the DMT process residue has a Drop Softening Point higher than about 80° C., the reaction mixture has an Acid No. of over 270, or both conditions are present. The diluent preferably is a material, liquid at 20°–25° C., which is desirable or useful in the use of partially hydrolyzed, DMT process residue. Thus, when partially hydrolyzed, DMT process residue is to be reacted with propylene oxide to give a polyol product for urethane foams, it is desirable for the polyol product to have a relatively low viscosity. Consequently, the diluent in such case desirably is dipropylene glycol, or other glycols containing four or more carbon atoms. The amount of diluent is dictated mainly by the desired viscosity of the end product of partially hydrolyzed, DMT process residue, and by the amount of diluent that is desired or can be tolerated in the end product. When partially hydrolyzed, DMT residue is to be used in the production of a propylene oxide reaction product for use as a polyol reactant in the production of low density rigid urethane foams, the amount of dipropylene glycol added should give a product with a viscosity of less than about 150,000 cps. at 25° C., (the viscosity being determined the same as the viscosity at 40° C. data hereinafter described, except it is determined at 25° C.), but the amount desirably should be less than 20% by weight of the product. The diluent can be incorporated into partially hydrolyzed, DMT residue by adding it to the mixture of water and residue prior to the partial hydrolysis of the residue, to the reaction mixture in the reactor during the hydrolysis reaction, to the reaction mixture in the reactor at the conclusion of the hydrolysis reaction, but before removal of unreacted water, or to the reaction mixture or product after removal of unreacted water, provided, particularly in this latter instance, the temperature of the reaction product is high enough to permit stirring of the diluent into the product.

Partially hydrolyzed, DMT process residue is useful as an acid reactant with propylene oxide to form a polyol product of this invention, which can be reacted with isocyanate containing material to form urethane foams and the like. Partially hydrolyzed, DMT process residue is useful as a low melting, high molecular weight acid mixture curing agent for epoxy resins. It is useful as an acid reactant in the production of alkyd resins, replacing in whole or in part such acid reactants as isophthalic acid and phthalic anhydride. It is useful as an acid reactant with propylene glycol to form an intermediate which can be reacted with maleic anhydride to form unsaturated polyesters such as, for example, styrene-soluble polyesters. Alternatively such polyesters can be prepared by simultaneous reaction of partially hydrolyzed DMT process residue, propylene glycol and maleic anhydride.

In the use of the partially hydrolyzed DMT process residue product of this invention for the preparation of unsaturated polyester resins, it might be desirable to have the product in solid flaked form for ease of handling. A flaked product with a Drop Softening Point of about 120° C. or higher (high enough that the flakes will not agglomerate when stored under summer temperature conditions) can easily be prepared by allowing partial re-esterification to take place with benzyl-type alcohols which were formed during the hydrolysis of benzyl ester type compounds in the residue. This is accomplished by, for example, releasing the pressure following hydrolysis while maintaining a high enough temperature (above about 150° C.) so that most of the water is removed and the equilibrium is shifted in favor of esterification. The extent of re-esterification depends on the amount of time the reaction mixture is maintained under these temperature and pressure conditions, and the temperature and water content of the reaction mixture. Thus, 62% of the hydroxyl containing components in a specific, partially hydrolyzed, DMT process residue reaction mixture with Acid No. of 290 and water content estimated at 1–2% by weight are re-esterified in two hours at 190° C. and atmospheric pressure.

The partially hydrolyzed, DMT process residue product of this invention also is useful as a direct reactant with isocyanates to form urethane foams, and in such use formulations of partially hydrolyzed, DMT process residue can include appropriate modifiers, especially aliphatic acids or glycols containing four or more carbons, to obtain desired foam properties. In some cases no foaming agent need be added because of the generation of carbon dioxide from the acids in partially hydrolyzed, DMT process residue.

The propylene oxide reaction product of partially hydrolyzed DMT process residue, which can be described as a propylene glycol half ester, is a useful source of the aromatic acid component for unsaturated polyester resins as well as a major source of the propylene glycol component, when the product is reacted with maleic anhydride. The amount of residue-based material which can be included in a resin formulation depends on both the initial Methoxyl value of the unhydrolyzed DMT process residue and the Methoxyl value of the product of partial hydrolysis. In general, for best results when making a resin from the propylene oxide reaction product the higher the initial Methoxyl value of DMT process residue the lower is the Methoxyl value of the partially hydrolyzed residue, subject to the limits for partially hydrolyzed DMT process residue disclosed herein.

The propylene oxide reaction product of this invention, which also is referred to as propoxylated partially hydrolyzed, DMT process residue is the product resulting from the reaction of part or all of the free carboxyl groups in partially hydrolyzed, DMT process residue with propylene oxide. It generally has the following chemical and physical properties:

| | |
|---|---|
| Appearance at 20–25° C. | Dark brown liquid |
| Acid No., mg KOH/g | 0.2–10 |
| Hydroxyl, % | 4–13.5 |
| Propylene glycol, % | 0.5–10 |
| Water, % | 0.1–2 |
| Viscosity at 40° C., cps | 2,000-tar-like |

The Hydroxyl data above hereinafter are obtained by ASTM method E 222-73, method B, and are reported on a waterfree basis.

The Viscosity at 40° C. data above and hereinafter are obtained with a Wells-Brookfield microviscometer with a CP-52 stainless steel cone. Measurement is at a mid range speed.

The propylene oxide reaction product is made by admixing partially hydrolyzed, DMT process residue and propylene oxide at about 80°–150° C. under a propylene oxide pressure of about 5–75 psig, and maintaining the reaction mixture in this temperature range until an Acid No. in the above indicated range has been achieved. When a propylene oxide reaction product containing a minimum of free glycol is desired, a catalyst such as benzyl trimethylammonium chloride can be employed. Also, the temperature of the melting range of the partially hydrolyzed, DMT process residue can be lowered, if desired, as above indicated, by adding a small amount of a glycol such as dipropylene glycol. Thid glycol is particularly useful in reducing the viscosity of the propylene oxide reaction product when it is to be used in the preparation of urethane foams.

A wide range of operating conditions apply in the reaction of propylene oxide with partially hydrolyzed, DMT process residue. In part the selection of conditions depends on the intended use of the reaction product. If the intended use is the production of low density rigid urethane foam, it is desirable to have a low content of free propylene glycol in the reaction product, and to avoid diester formation. To achieve this, it is helpful to have a low reaction temperature (for example, about 80°–130° C.) and to use a catalyst such as benzyl trimethylammonium chloride, rather than an alkali metal catalyst such as KOH. See the U.S. Pat. No. 2,910,490, to Malkemus for catalyst and reaction conditions which favor production of glycol monoesters of organic carboxylic acids. However, for other intended uses it is desirable to use catalysts which promote the etherification of propylene glycol, so that substantial amounts of the dipropylene glycol ester are formed. For some intended uses such as sprayable urethane foams, it is desirable to react the propoxylated, partially hydrolyzed, DMT process residue, or propylene oxide reaction product, with ethylene oxide to increase the concentration of primary hydroxyl end groups.

With the use of a catalyst in the reaction of propylene oxide with partially hydrolyzed, DMT process residue, the reaction rate of propylene oxide with the partially hydrolyzed material can be very fast. As a practical matter, the rate at which heat of reaction is removed from the reaction mixture can be the principal determinant of production rate in a commercial reactor. Depending on reactor design and desired degree of conversion of carboxyl end groups, the reaction probably can be completed in as short a time as about ten minutes.

The best mode now contemplated of carrying out the invention is illustrated by the following examples of preferred embodiments of this invention. In these examples all parts and percentages are by weight unless indicated otherwise.

EXAMPLE 1

This example illustrates a specific embodiment of partially hydrolyzed, DMT process residue, and its preparation.

To a reactor fitted with a mixer is charged DMT process residue (1000 parts) having the following properties:

| | |
|---|---|
| Appearance at 20-25° C. | Dark brown tar |
| Acid No., mg KOH/g | 28 |
| Drop Softening Point, °C. | 44 |
| Methoxyl, % | 20.4 |
| Dimethyl terephthalate, % | 2.6 | and water (110 parts). While the charge is mixed together, it is established under pressure at 250° C. and held under these conditions for 45 minutes, at which point the pressure typically is 650 psig. The reactor contents are cooled over a period of about one hour to 110° C. via internal cooling coils in the reactor. The pressure is then dropped to atmospheric pressure while the temperature is maintained at 110° C. The reaction mixture thus obtained, the desired partially hydrolyzed, DMT process residue, typically has the following properties:

| | |
|---|---|
| Appearance at 20-25° C. | Dark brown balsamic solid |
| Acid No., mg KOH/g | 148 |
| Drop Softening Point, °C. | 63 |
| Methoxyl, % | 15.3 |
| Water, % | 1.7 |
| Viscosity at 130° C., cps | 7400 |

EXAMPLE 2

This example illustrates another specific embodiment of partially hydrolyzed, DMT process residue, and its preparation.

DMT process residue (1000 parts) having the properties specified in Example 1, and water (500 parts) are introduced into a reactor fitted with a mixer. The reactor contents are established under pressure at 250° C. while being mixed together, and are held under these conditions for 45 minutes, at which point the pressure typically is 650 psig. The reactor contents are cooled over a period of about one hour to 115° C. via internal cooling coils in the reactor. The pressure is then dropped to atmospheric pressure while the temperature is maintained at 110° C. The reaction mixture thus obtained, which is partially hydrolyzed, DMT process residue, typically has the following properties:

| | |
|---|---|
| Appearance at 20-25° C. | Dark brown, balsamic solid |
| Acid No., mg KOH/g | 270 |
| Drop Softening Point, °C. | 112 |
| Methoxyl, % | 9.8 |
| Water, % | 1.1 |
| Viscosity at 130° C., cps | 42,000 |

Typically the product at 130° C. is an opaque, dark brown, viscous liquid containing dispersed solids (primarily terephthalic acid).

EXAMPLE 3

This example illustrates still another specific embodiment of partially hydrolyzed, DMT process residue, and its preparation.

To a reactor is charged DMT process residue (1000 parts) having the properties specified in Example 1, and water (1240 parts). While the reactor contents are stirred, they are heated under pressure to 250° C. and held under these conditions for 45 minutes, at which point the pressure typically is 650 psig. The reactor contents are cooled over a period of about one hour to 110° C. via internal cooling coils in the reactor. The pressure is then dropped to atmospheric pressure while the temperature is maintained at 110° C. Dipropylene glycol (150 parts) is added to reduce the Drop Softening Point and viscosity of the final product. The reaction mixture thus obtained, the desired diluted, partially hydrolyzed, DMT process residue, typically has the following properties:

| | |
|---|---|
| Appearance at 20-25° C. | Dark brown balsamic solid |
| Acid No., mg KOH/g | 298 |
| Drop Softening Point, °C. | 75 |
| Methoxyl, % | 3.8 |
| Water, % | 1.4 |
| Dipropylene glycol, % | 13.9 |
| Viscosity at 130° C., cps | 1200 |

EXAMPLE 4

This example illustrates still another specific embodiment of partially hydrolyzed, DMT process residue, and its preparation as a flakeable product.

To a reactor is charged DMT process residue (1000 parts) having the properties specified in Example 1, and water (1240 parts). While the reactor contents are stirred, they are heated under pressure to 250° C. and held under these conditions for 45 minutes, at which point the pressure typically is 650 psig. The reactor contents in this instance are cooled to only 190° C. and maintained at this temperature while venting to atmospheric pressure. After an additional 2 and ½ hours at 290° C. to allow partial re-esterification to take place, the reactor contents are fed to a water-cooled belt flaker, from which a friable, flaked product is obtained. Typical properties of this product are:

| | |
|---|---|
| Appearance at 20-25° C. | Dark brown to black friable, flaked solid. |
| Acid No. mg KOH/g | 300 |
| Drop Softening Point, °C. | 125 |

| | |
|---|---|
| Methoxyl, % | 5.8 |

EXAMPLE 5

This example illustrates a specific embodiment of the propylene oxide reaction product of partially hydrolyzed, DMT process residue, and its preparation.

Charged to a stirred reactor are partially hydrolyzed, DMT process residue (100 parts) of Example 1, and benzyl trimethylammonium chloride (0.6 part). The reactor is purged of air by alternately pressurizing with nitrogen and applying a vacuum. The resulting mixture is heated to 100° C. Propylene oxide (16.2 parts) is charged to the reactor over about 2 minutes while the temperature of the resulting reaction mixture is maintained at about 110° C. Typically the pressure in the reactor increases to 42 psig. but about ten minutes later it decreases to 4 psig. At this point the reactor is placed under vacuum at 110° C. to remove residual propylene oxide, and then the reaction mixture is cooled to room temperature.

The propoxylated, partially hydrolyzed, DMT process residue product thus obtained typically has the following properties:

| | |
|---|---|
| Appearance at 20–25° C. | Dark brown, viscous liquid |
| Acid No., mg KOH/g | <1 |
| Hydroxyl, % | 5.0 |
| Propylene glycol, % | 0.2 |
| Dipropylene glycol, % | 0 |
| Water, % | 0.2 |
| Viscosity at 40° C., cps | 18,000 |

EXAMPLE 6

This example illustrates another specific embodiment of the propylene oxide reaction product of this invention, and its preparation.

Partially hydrolyzed, DMT process residue (100 parts) of Example 2, dipropylene glycol (10 parts) and benzyl trimethyl-ammonium chloride (1 part) are charged to a stirred reactor which thereafter is purged of air by alternately pressurizing with nitrogen and applying a vacuum. The resulting mixture is heated to 100° C. Propylene oxide (23.7 parts) is charged to the reactor over about 10 minutes time. The temperature of the reaction mixture is maintained at about 110° C. During the next 1.5 hours, the Acid No. typically drops to 6.9. An additional 1.1 parts of propylene oxide are added and 40 minutes later the Acid No. typically is 1.1. The reactor is placed under vacuum at 102° C. for 15 minutes to remove any unreacted propylene oxide. Then the reaction mixture is cooled to room temperature to give a propoxylated, partially hydrolyzed, DMT process residue product having typically the following properties:

| | |
|---|---|
| Appearance at 20–25° C. | Dark brown viscous liquid |
| Acid No., mg KOH/g | 1.1 |
| Hydroxyl, % | 6.8 |
| Propylene glycol, % | 0.9 |
| Dipropylene glycol, % | 4.8 |
| Water, % | 0.25 |
| Viscosity at 130° C., cps | 19,300 |

EXAMPLE 7

This example illustrates still another specific embodiment of the propylene oxide reaction product of this invention, and its preparation.

Partially hydrolyzed, DMT process residue (100 parts) of Example 3, dipropylene glycol (10 parts), and benzyl trimethylammonium chloride (1 part) are charged to a stirred reactor. The reactor is purged of air by alternately pressurizing with nitrogen and applying a vacuum. The mixture in the reactor is heated to 100° C., and propylene oxide (32.2 parts) is charged to the reactor over a period of about 8 minutes. The temperature of the reaction mixture is maintained at about 110° C. during the next 100 minutes. During this period of time the Acid No. of the reaction mixture typically reaches about 3.5. Then additional propylene oxide (1.8 parts) is added and allowed to react at 110° C. for 45 minutes, at which point the Acid No. typically is less than 1. Any residual propylene oxide is removed by placing the reactor under vacuum at 105° C. for 15 minutes. The reactor then is cooled to room temperature.

The propoxylated, partially hydrolyzed, DMT process residue thus obtained has typically the following properties:

| | |
|---|---|
| Appearance at 20–25° C. | Dark brown viscous liquid |
| Acid No., mg KOH/g | <1 |
| Hydroxyl, % | 10.1 |
| Propylene glycol, % | 1.0 |
| Dipropylene glycol, % | 7.2 |
| Water, % | 0.5 |
| Viscosity at 40° C., cps | 8370 |

EXAMPLE 8

This example illustrates the use of the partially hydrolyzed, DMT process residue product of this invention to make unsaturated polyester resins.

An unsaturated polyester resin is prepared from the partially hydrolyzed DMT process residue of Example 5 by charging to a stirred reactor (fitted with a short packed distillation column and a condenser) 100 parts of this residue, 71.5 parts of propylene glycol, 51 parts of maleic anhydride, and 0.07 parts of zinc acetate dihydrate. The charge is heated to 165° C., at which point water from the esterification reactions begins to distill off. Heating is continued at 215° C. and then the temperature is held at 215° to 225° C. for a total of 5 hours. The reaction mixture then is cooled to 180° C., and hydroquinone (0.04 parts) is added as a stabilizer. The unsaturated polyester resin thus obtained has an Acid Number of 18, and on dissolving in styrene at 60% total solids gives a viscosity of 1770 cps. at 25° C.

The specific embodiments of the propylene oxide reaction product of this invention, which are exemplified by Examples 4–6, are useful as polyol reactants in the production of urethane foam insulation. For example, when a premix of the following conventional formulation:

| Components | Parts |
| --- | --- |
| Principal polyol material | 244 |
| Niax LA-700 polyol | 120 |
| Fyrol 6 | 62 |
| Dow Corning 193 silicone surfactant | 9 |
| T-125 catalyst | 0.5 |
| Polycat 12 catalyst | 0.5 |
| Freon | 165 |

Niax LA-700 polyol is a commercial diethylene triamine based polyol product from Union Carbide Corporation; Fyrol 6 is a product from Stauffer Chemical Co., consisting essentially of diethyl N,N-bis (2-hydroxyethyl) aminomethyl phosphonate; Dow Corning 193 silicone surfactant is a product of Dow Corning Corp.; T-125 catalyst is supplied by M & T Chemical Corp., and consists essentially of dibutyl tin maleate; Polycat 12 is a proprietary amine catalyst supplied by Abbott Laboratories; and Freon is a blowing agent composed of trichloro monofluoromethane and is supplied by E. I. du Pont and de Nemours & Co.] is prepared with the propylene oxide reaction product of Example 5 as the principal polyol material, and then is mixed with PAPI polymeric isocyanate (436 parts) supplied by the Upjohn Company and composed of a mixture of polymethylene-polyphenyl isocyanates with a functionality of about 2.65, a urethane foam of two pounds per cubic foot density is obtained, which shows properties for use as good insulating material.

Hence, this invention provides useful compositions of matter with features of advantage.

Other features, advantages and specific embodiments of this invention will become apparent to those exercising ordinary skill in the art after reading the foregoing disclosures. Such specific embodiments are within the scope of this invention. Moreover, while specific embodiments of the invention have been described in considerable detail, it is not limited thereto, and variations and modifications of those embodiments can be effected without departing from the spirit and scope of the invention.

I claim:

1. As a composition of matter, partially hydrolyzed, DMT process residue, characterized by an Acid No. of about 150–375 mg. KOH/g.

2. A process for preparing partially hydrolyzed, DMT process residue, which comprises establishing a mixture of water and DMT process residue at a weight ratio of water to residue of about 0.05–5, a temperature of 200°–285° C. and a pressure of 220–1150 psig, and maintaining said mixture under these conditions until the Acid No. thereof has increased to about 150–375 mg. KOH/g.

3. The process according to claim 2 in which, after the partially hydrolyzed, DMT process residue has been formed, residual water is removed.

4. As a composition of matter, a mixture of partially hydrolyzed, DMT process residue characterized by an Acid No. of about 150–375 mg. KOH/g, and a glycol containing 4 or more carbon atoms.

5. A composition of matter according to claim 4 in which said glycol is dipropylene glycol.

6. As a composition of matter, the propylene oxide reaction product of partially hydrolyzed, DMT process residue, which residue is characterized by an Acid No. of about 150–375 mg KOH/g.

7. A composition of matter according to claim 6 in which the Acid No. of the reaction product is about 0.2–10 mg KOH/g and the Hydroxyl value of the reaction product is 4–13.5%.

8. As a composition of matter, a mixture consisting essentially of the propylene oxide reaction product of partially hydrolyzed, DMT process residue, which residue is characterized by an Acid No. of about 150–375 mg. KOH/g., and dipropylene glycol up to about 20% of the mixture.

9. A composition of matter according to claim 8, the viscosity of which at 25° C. is less than 150,000 cps.

* * * * *

UNITED STATES PATENT AND TRADEMARK OFFICE
CERTIFICATE OF CORRECTION

PATENT NO. : 4,394,286

DATED : July 19, 1982

INVENTOR(S) : William H. Millick III

It is certified that error appears in the above-identified patent and that said Letters Patent are hereby corrected as shown below:

In column 1 at line 60 " 1/16 " should read -- 1/64 -- .

Signed and Sealed this

Eleventh Day of October 1983

[SEAL]

Attest:

GERALD J. MOSSINGHOFF

Attesting Officer

Commissioner of Patents and Trademarks